United States Patent
Lee et al.

(10) Patent No.: US 12,113,186 B2
(45) Date of Patent: Oct. 8, 2024

(54) ELECTRODE FOR ALL SOLID-STATE BATTERY INCLUDING SOLID ELECTROLYTE

(71) Applicant: LG CHEM, LTD., Seoul (KR)

(72) Inventors: Jung-Pil Lee, Daejeon (KR); Ji-Young Kim, Daejeon (KR); Hyo-Sik Kim, Daejeon (KR); Eun-Kyung Mok, Daejeon (KR); Seung-He Woo, Daejeon (KR); Hye-Ri Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 80 days.

(21) Appl. No.: 16/482,542

(22) PCT Filed: Sep. 11, 2018

(86) PCT No.: PCT/KR2018/010643
§ 371 (c)(1),
(2) Date: Jul. 31, 2019

(87) PCT Pub. No.: WO2019/054729
PCT Pub. Date: Mar. 21, 2019

(65) Prior Publication Data
US 2020/0006819 A1      Jan. 2, 2020

(30) Foreign Application Priority Data
Sep. 13, 2017  (KR) .................. 10-2017-0117375

(51) Int. Cl.
*H01M 10/52* (2006.01)
*H01M 4/36* (2006.01)
*H01M 4/62* (2006.01)

(52) U.S. Cl.
CPC .......... *H01M 10/52* (2013.01); *H01M 4/366* (2013.01); *H01M 4/62* (2013.01)

(58) Field of Classification Search
None
See application file for complete search history.

(56) References Cited

U.S. PATENT DOCUMENTS

| 4,520,082 A | 6/1985 | Makiel |
| 10,714,743 B2 * | 7/2020 | Lee ..................... H01M 4/0416 |

(Continued)

FOREIGN PATENT DOCUMENTS

| CN | 209071510 U | 7/2019 |
| EP | 3 104 438 A1 | 12/2016 |

(Continued)

OTHER PUBLICATIONS

European Search Report for Appl. No. 18855823.3 dated Mar. 25, 2020.

(Continued)

*Primary Examiner* — Haroon S. Sheikh
(74) *Attorney, Agent, or Firm* — Birch, Stewart, Kolasch & Birch, LLP

(57) ABSTRACT

An electrode for an all solid-state battery including an electrode current collector, and an electrode active material layer formed on at least one surface of the electrode current collector, wherein the electrode active material layer includes electrode active material particles, a solid electrolyte coated on at least part of surface of the electrode active material particles to connect the electrode active material particles to each other, and a linear structure distributed between the electrode active material particles.

9 Claims, 2 Drawing Sheets

(56) References Cited

U.S. PATENT DOCUMENTS

| | | | |
|---|---|---|---|
| 10,868,296 B2* | 12/2020 | Lee | H01M 4/0404 |
| 2002/0006662 A1 | 1/2002 | Ishida et al. | |
| 2011/0300440 A1 | 12/2011 | Matsuda et al. | |
| 2012/0110835 A1* | 5/2012 | Hudson | H01M 10/0565 |
| | | | 427/77 |
| 2012/0261871 A1 | 10/2012 | Kaufmann | |
| 2016/0141609 A1* | 5/2016 | Mikuni | H01M 4/5825 |
| | | | 429/231.8 |
| 2016/0268627 A1 | 9/2016 | Lee et al. | |
| 2016/0270636 A1 | 9/2016 | Kawakami et al. | |
| 2017/0054148 A1* | 2/2017 | Ding | H01M 4/623 |
| 2017/0214051 A1* | 7/2017 | Yoon | H01M 4/364 |
| 2018/0287206 A1 | 10/2018 | Makino et al. | |
| 2019/0341616 A1* | 11/2019 | Yoon | H01M 10/0525 |

FOREIGN PATENT DOCUMENTS

| | | |
|---|---|---|
| JP | H05-205777 A | 8/1993 |
| JP | 2005-85675 A | 3/2005 |
| JP | 2005-085675 A | 3/2005 |
| JP | 2006-210080 A | 8/2006 |
| JP | 2010-202764 A | 11/2010 |
| JP | 4577024 B2 | 11/2010 |
| JP | 4611345 B2 | 1/2011 |
| JP | 2011-233334 A | 11/2011 |
| JP | 2013-196968 A | 9/2013 |
| JP | 2017-004708 A | 1/2017 |
| KR | 10-1998-0080161 A | 11/1998 |
| KR | 10-2011-0134268 A | 12/2011 |
| KR | 10-2014-0087376 A | 7/2014 |
| KR | 10-2014-0094676 A | 7/2014 |
| KR | 10-2015-0055186 A | 5/2015 |
| KR | 10-2016-0043939 A | 4/2016 |
| KR | 10-2016-0108932 A | 9/2016 |
| KR | 10-2017-0050234 A | 5/2017 |
| WO | WO 2017/111132 A1 | 6/2017 |

OTHER PUBLICATIONS

International Search Report for PCT/KR2018/010643 (PCT/ISA/210) mailed on Dec. 17, 2018, with English translation.

* cited by examiner

ELECTRODE FOR ALL SOLID-STATE BATTERY INCLUDING SOLID ELECTROLYTE

TECHNICAL FIELD

The present application claims priority to Korean Patent Application No. 10-2017-0117375 filed on Sep. 13, 2017 in the Republic of Korea, the disclosures of which are incorporated herein by reference. The present disclosure relates to an electrode for an all solid-state battery including a solid electrolyte, and more particularly, to an electrode for an all solid-state battery for easily discharging out gas produced during charging and discharging.

BACKGROUND ART

A lithium ion battery using a liquid electrolyte has a structure in which a negative electrode and a positive electrode are separated by a separator, and when the separator is damaged by deformation or external impacts, a short may occur, leading to danger such as overheat or explosion. Accordingly, development of a solid electrolyte is a very important challenge to ensure safety in the field of lithium ion secondary batteries.

A lithium secondary battery using a solid electrolyte has advantages that safety of the battery is enhanced, reliability of the battery is improved by preventing the leakage of an electrolyte solution, and it is easy to manufacture thin batteries. Additionally, lithium metal can be used for a negative electrode, improving the energy density, and accordingly, applications in not only small secondary batteries but also high capacity secondary batteries for electric vehicles are expected, so attention is paid as a next-generation battery.

FIG. 1 is a schematic cross-sectional view of an electrode after charging/discharging of a lithium secondary battery including the electrode to which a solid electrolyte is applied. Referring to FIG. 1, during charging/discharging of the lithium secondary battery including a solid electrolyte 22, gas is produced by reaction of electrode active material particles 21 and the solid electrolyte 22, and gas is not discharged out of the electrode and is trapped in the electrode, unlike in a liquid electrolyte system. Thus, the electrode interfacial resistance is increased, causing a problem with shortening of service life of the battery.

DISCLOSURE

Technical Problem

Accordingly, the present disclosure is directed to providing an electrode for an all solid-state battery from which gas produced by reaction of an electrode active material and a solid electrolyte can easily come out.

Technical Solution

To solve the above-described problem, the present disclosure provides an electrode for an all solid-state battery. A first aspect of the present disclosure relates to the electrode for an all solid-state battery, including: an electrode current collector, and an electrode active material layer formed on at least one surface of the electrode current collector, wherein the electrode active material layer includes electrode active material particles, a solid electrolyte coated on at least part of a surface of the electrode active material particles to connect the electrode active material particles to each other, and a linear structure distributed between the electrode active material particles.

According to a second aspect of the present disclosure, in the first aspect, the electrode active material layer may further include a conductive material that is distributed on the surface of the electrode active material particles, and inside of the solid electrolyte or on a surface of the solid electrolyte.

According to a third aspect of the present disclosure, in any one of the previous aspects, microporous channels may be formed between the electrode active material particles and the linear structure.

According to a fourth aspect of the present disclosure, in any one of the previous aspects, the solid electrolyte may include at least one selected from the group consisting of a polymer solid electrolyte, a polymer gel electrolyte, a sulfide-based solid electrolyte, an oxide-based solid electrolyte, and mixtures thereof.

According to a fifth aspect of the present disclosure, in any one of the previous aspects, the linear structure may include at least one selected from the group consisting of a carbon material and a ceramic material.

According to a sixth aspect of the present disclosure, in any one of the previous aspects, the linear structure may include a carbon material, and the carbon material may include at least one selected from the group consisting of vapor growth carbon fiber (VGCF), carbon nanotube (CNT), carbon nano fiber (CNF), and mixtures thereof.

According to a seventh aspect of the present disclosure, in any one of the previous aspects, the linear structure may include a ceramic material, and the ceramic material may include at least one selected from the group consisting of metal oxide and metal nitride.

According to an eighth aspect of the present disclosure, in any one of the previous aspects, the linear structure may include a ceramic material, wherein the linear structure may be coated with a conductive material on a surface thereof.

According to a ninth aspect of the present disclosure, in any one of the previous aspects, the linear structure may be 1 to 100 μm in length.

Meanwhile, the present disclosure relates to an all solid-state battery, and the electrode includes a positive electrode, a negative electrode, and a solid electrolyte layer interposed between the positive electrode and the negative electrode, wherein at least one of the positive electrode and the negative electrode is the electrode according to any one of the previous aspects.

Advantageous Effects

According to an embodiment of the present disclosure, gas produced by reaction of an electrode active material and a solid electrolyte is discharged out of the electrode along a linear structure distributed between electrode active material particles, thereby easily removing gas inside the electrode.

Accordingly, it is possible to prevent the problem with shortening of service life of the battery by suppressing the rise of resistance at the electrode interface.

BRIEF DESCRIPTION OF THE DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize more clear description.

MODE FOR CARRYING OUT THE INVENTION

Figure 1:
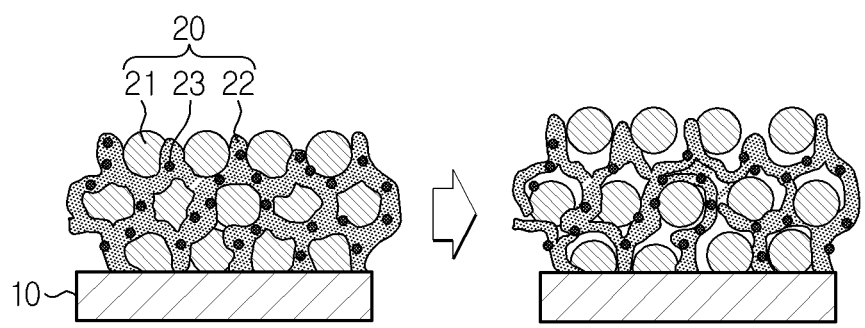
FIG. 1 is a schematic cross-sectional view of an electrode after charging/discharging of a battery including the electrode to which a solid electrolyte is applied according to the related art.

Hereinafter, the present disclosure will be described in detail with reference to the accompanying drawings. It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and variations could be made thereto at the time the application was filed.

The term ⌈comprises⌋ when used in this specification, specifies the presence of stated elements, but does not preclude the presence or addition of one or more other elements, unless the context clearly indicates otherwise.

The terms ⌈about⌋ and ⌈substantially⌋ are used herein in the sense of at, or nearly at, when given the manufacturing and material tolerances inherent in the stated circumstances and are used to prevent the unscrupulous infringer from unfairly taking advantage of the invention disclosure where exact or absolute figures are stated as an aid to understanding the invention.

⌈A and/or B⌋ when used in this specification, specifies ⌈either A or B or both⌋.

In the following specification of the present disclosure, specific terms are used for convenience and are not limiting. The terms as ⌈right⌋, ⌈left⌋, ⌈top⌋ and ⌈bottom⌋ refer to the directions in the drawings to which reference is made. The terms as 'inward' and 'outward' refer to the directions toward or away from the geometrical centers of the designated devices, systems and members thereof. The terms ⌈front⌋, ⌈rear⌋, ⌈up⌋, ⌈down⌋ and related words and phrases refer to the locations and directions in the drawing to which reference is made and are not limiting. These terms include the above-listed words, derivatives thereof and synonyms thereof.

An electrode for an all solid-state battery according to the present disclosure is characterized by including an electrode current collector, and an electrode active material layer formed on at least one surface of the electrode current collector, wherein the electrode active material layer includes a plurality of electrode active material particles, a solid electrolyte coated on at least part of the surface of the plurality of electrode active material particles to connect the plurality of electrode active material particles, and a linear structure distributed between the plurality of electrode active material particles.

Figure 2:
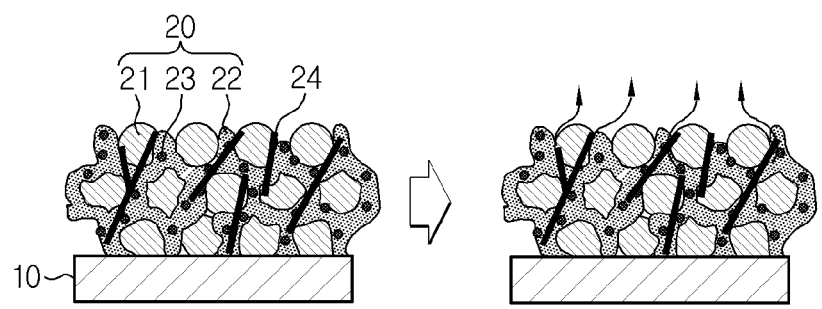
FIG. 2 is a schematic cross-sectional view of an electrode after charging/discharging of a battery including the electrode according to an embodiment of the present disclosure.

FIG. 2 is a schematic cross-sectional view of the electrode after charging/discharging of the battery including the electrode according to an embodiment of the present disclosure. Referring to FIG. 2, gas produced by reaction of the electrode active material particles 21 and the solid electrolyte 22 is discharged out of the electrode along the linear structure 24 distributed between the electrode active material particles 21, to be more specific, through pores around the linear structure formed by the linear structure, providing an effect that gas does not remain in isolation within the electrode and gas within the electrode can be easily removed. Thus, it is possible to prevent the problem with shortening of service life of the battery by suppressing the volume expansion of the electrode caused by the generated gas and the rise of resistance at the electrode interface. In the electrode according to an embodiment of the present disclosure, micropores derived from spaces or interstitial volumes created by the bonds of the components may be formed between the plurality of electrode active material particles and the linear structure, and these micropores may be connected to form microchannels communicating with the outside of the electrode. These channels are provided as a gas flow path, through which gas within the electrode can be discharged out of the electrode more efficiently.

In an embodiment of the present disclosure, the linear structure may include a carbon material and/or a ceramic material, but is not limited thereto. The linear structure may include any type of material that is rigid enough to maintain the linear shape in the electrode while not causing any side reaction in the electrode. The carbon material is preferably for the linear structure in terms of providing conductivity. Meanwhile, ceramic materials are advantageous in terms of maintaining the linear shape in the electrode manufacturing process and/or the battery manufacturing process.

In an embodiment of the present disclosure, the ceramic material may include, but is not limited to, at least one selected from vapor growth carbon fiber (VGCF), carbon nanotube (CNT) and carbon nano fiber (CNF).

In an embodiment of the present disclosure, the ceramic material may include halloysite nanotube (HNT, Sigma-Aldrich), metal oxide and/or metal nitride. The metal oxide or nitride includes, but is not limited to, oxide or nitride including one or more selected from Si, Al, Ti, Zn, Zr and Fe. For example, the metal oxide may be at least one selected from halloysite, rhyolite, $TiO_2$, ZnO, $ZnO_2$, $Fe_2O_3$, $Fe_3O_4$, $SiO_2$, $Al_2O_3$ and $ZrO_2$. Meanwhile, in an embodiment of the present disclosure, when the linear structure is a ceramic material, the above materials may be coated with a conductive material on the surface. The conductive material may include, for example, carbon black such as acetylene black, ketjen black, channel black, furnace black, lamp black and thermal black.

Particularly, the linear structure may come in various forms including rod, whisker, wire, fiber and tube.

In an embodiment of the present disclosure, in terms of forming the gas flow path or the microchannels, the linear structure preferably has an aspect ratio of 3 or more. For example, the linear structure may be 1 μm to 100 μm long, and preferably 5 μm to 50 μm long within the above-described aspect ratio range. When the above-described length is satisfied, micropores are formed well between the electrode active material particles and the linear structure, and gas produced during charging and discharging can be easily discharged out of the electrode through the formed micropores. Meanwhile, in the present disclosure, the linear structure satisfies the aspect ratio and may have the diameter of 30 nm to 10 μm.

Meanwhile, in an embodiment of the present disclosure, the linear structure may exhibit the range of 10 MPa to 100 MPa in terms of tensile strength. When the tensile strength of the linear structure satisfies the above-described range, the linear structure does not deform in the electrode rolling process and maintains the initial aspect ratio, and accordingly it is possible to have gas outlet channels of desired resin and stably maintain the shape. Additionally, the electrode active material layer may further include a conductive material that is distributed on the surface of the plurality of electrode active material particles, and inside of the solid electrolyte or on the surface of the solid electrolyte.

In this instance, the conductive material added is generally present in an amount of 0.1 to 30 weight % based on the total weight of the mixture including the electrode active material. The conductive material is not limited to any particular type when the material has conductivity while not causing a chemical change to the corresponding battery, and may include, for example, one selected from graphite such as natural graphite or artificial graphite; carbon black such as carbon black, acetylene black, ketjen black, channel black, furnace black, lamp black and thermal black; conductive fiber such as carbon fiber or metal fiber; metal powder such as fluorocarbon, aluminum and nickel powder; conductive whisky such as oxide zinc and potassium titanate; conductive metal oxide such as titanium oxide; and conductive material such as polyphenylene derivatives, or mixtures thereof.

Additionally, in the present disclosure, the electrode has an electrode current collector, and the electrode current collector exhibits electrical conductivity of a metal plate and an appropriate electrode current collector may be used according to the polarity of known current collector electrode in the field of secondary batteries.

Meanwhile, in the present disclosure, the electrode for an all solid-state battery may be any one of a negative electrode and a positive electrode. When the electrode is a negative electrode, the electrode active material may include any type of material that can be used as a negative electrode active material of a lithium ion secondary battery. For example, the negative electrode active material may include at least one selected from carbon such as non-graphitizable carbon and graphite-based carbon; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Groups 1, 2 and 3 in the periodic table, halogen; $0 \leq x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni-based material; titanium oxide; and lithium titanium oxide. In a particular embodiment, the negative electrode active material may include a carbon-based material and/or Si.

When the electrode is a positive electrode, the electrode active material may be of any type that can be used as a positive electrode active material of a lithium ion secondary battery without limitation. For example, the positive electrode active material may include layered compound such as lithium cobalt oxide ($LiCoO_2$) and lithium nickel oxide ($LiNiO_2$) or compound with one or more transition metal substitution; lithium manganese oxide of chemical formula $Li_{1+x}Mn_{2-x}O_4$ (where x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni-site lithium nickel oxide represented by chemical formula $LiNi_{1-x}M_xO_2$ (where M=Co, Mn, Al, Cu, Fe, Mg, B or Ga, x=0.01~0.3); lithium manganese composite oxide represented by chemical formula $LiMn_{2-x}M_xO_2$ (where M=Co, Ni, Fe, Cr, Zn or Ta, x=0.01~0.1) or $Li_2Mn_3MO_8$ (where M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in chemical formula; disulfide compound; and $Fe_2(MoO_4)_3$. However, the positive electrode active material is not limited thereto.

In the present disclosure, the solid electrolyte is coated on the surface of the electrode active material particles at least in part or in whole, and the electrode active material particles are integrated via point-to-point binding and/or plane-to-plane binding by the medium of the solid electrolyte to form an integrated electrode active material layer.

Additionally, the solid electrolyte of the present disclosure may be appropriately used according to the type of the electrode, and for example, in the case of the positive electrode, it is desirable to use a solid electrolyte with good oxidation stability, and in the case of the negative electrode, it is desirable to use a solid electrolyte with good reduction stability. Because its primary role is to transport lithium ions in the electrode, the solid electrolyte of the present disclosure includes any material with high ionic conductivity of, for example, $10^{-5}$ s/m or more, and preferably $10^{-4}$ s/m or more, but is not limited to a particular type.

In this instance, the solid electrolyte may include at least one selected from a polymer-based solid electrolyte, a sulfide-based solid electrolyte and an oxide-based solid electrolyte. The polymer-based solid electrolyte may be a polymer solid electrolyte formed by adding polymer resin to a solvated lithium salt, an organic electrolyte solution containing an organic solvent and a lithium salt, an ionic liquid, or a polymer gel electrolyte containing a monomer or oligomer in polymer resin. Meanwhile, the sulfide-based solid electrolyte has high ionic conductivity, the oxide-based solid electrolyte has good electrochemical stability. Accordingly, an appropriate solid electrolyte substance may be selected and used according to the characteristics of the solid electrolyte and the purpose of use of the battery.

In this instance, the polymer solid electrolyte may include, for example, polyether-based polymer, polycarbonate-based polymer, acrylate-based polymer, polysiloxane-based polymer, phosphagen-based polymer, polyethylene derivatives, alkylene oxide derivatives, phosphoric acid ester polymer, poly agitation lysine, polyester sulfide, polyvinyl alcohol, polyvinylidene fluoride, and polymer containing ionic dissociation groups. Additionally, the polymer solid electrolyte may include polymer resin including branched copolymer made by copolymerization of a comonomer of amorphous polymer such as PMMA, polycarbonate, polysiloxane (pdms) and/or phosphagen into the main chain of poly ethylene oxide (PEO), comb-like polymer and crosslinked polymer, and mixtures of these polymers.

Additionally, the polymer gel electrolyte includes an organic electrolyte solution containing a lithium salt and polymer resin, and the organic electrolyte solution is present in an amount of 60~400 parts by weight based on the weight of the polymer resin. The polymer applied to the gel electrolyte is not limited to a particular component, but may include, for example, polyether-based, PVC-based, PMMA-based, polyacrylonitrile (PAN), polyvinylidene fluoride (PVdF) and poly(vinylidene fluoride-hexafluoropropylene) (PVdF-HFP). Additionally, mixtures of these polymers are available.

In this instance, the lithium salt may be an ionizable lithium salt represented as $Li^+X^-$. The anion of the lithium salt is not limited to a particular type, but may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In an embodiment of the present disclosure, the sulfide-based solid electrolyte contains sulfur (S) and has ionic conductivity of metal belonging to Group 1 or 2 in the periodic table, and may include Li—P—S-based glass or Li—P—S-based glass ceramics. The sulfide-based solid electrolyte may be, by way of non-limiting example, $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S$—$Al_2S_3$, $Li_2S$—$GeS_2$ and $Li_2S$—$GeS_2$—$ZnS$, and may include at least one of these. Additionally, the oxide-based solid electrolyte includes oxygen (O) and has ionic conductivity of metal belonging to Group 1 or 2 in the periodic table. Its non-limiting examples may include at least one selected from LLTO-based compound, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compound, LATP-based compound, $Li_{1+x}Ti_{2-x}Al_xSi_y(PO_4)_{3-y}$ (where $0 \leq x \leq 1$, $0 \leq y \leq 1$), $LiAl_xZr_{2-x}(PO_4)_3$ (where $0 \leq x \leq 1$, $0 \leq y \leq 1$), $LiTi_xZr_{2-x}(PO_4)_3$ (where $0 \leq x \leq 1$, $0 \leq y \leq 1$), LISICON-based compound, LIPON-based compound, perovskite-based compound, NASICON-based compound and LLZO-based compound.

Meanwhile, the present disclosure provides a lithium secondary battery including at least one electrode for an all solid-state battery described above. Generally, in the all solid-state battery, the solid electrolyte included in the electrode may act as a separator. However, when an electrode for an all solid-state battery is applied to only one electrode, a separate polymer separation membrane may be additionally needed.

Here, the polymer separation membrane is interposed between the negative electrode and the positive electrode, and plays a role in electrically isolating the negative electrode and the positive electrode and allowing lithium ions to pass therethrough. The polymer separation membrane includes any type of polymer separation membrane that can be used in the field of general all solid-state batteries, and is not limited to a particular type.

Additionally, the present disclosure provides a battery module including the lithium ion secondary battery as a unit battery, a battery pack including the battery module, and a device including the battery pack as a power source.

In this instance, specific examples of the device may include, but are not limited to, power tools; electric vehicles including Electric Vehicle (EV), Hybrid Electric Vehicle (HEV) and Plug-in Hybrid Electric Vehicle (PHEV); electric two-wheelers including E-bike and E-scooter; electric golf cart; and energy storage systems, powered and driven by an electric motor.

Hereinafter, the present disclosure will be described in more detail through examples, but the following examples are provided for illustration purposes only and the scope of the present disclosure is not limited thereto.

1. Example 1

(1) Manufacture of Negative Electrode

Artificial graphite having an average particle size ($D_{50}$) of 20 μm, carbon black as a conductive material, a polymer solid electrolyte (PEO+LiFSI, 20:1 (mole ratio)), and a linear structure of vapor growth carbon fiber (VGCF 20 μm long) were mixed at a weight ratio of 70:5:20:5, yielding 5 g of a mixture. Acetonitrile (AN) was added to the mixture to prepare a negative electrode slurry having a solid content of 30%.

Subsequently, the negative electrode slurry was applied to a 20 μm thick copper current collector, and was vacuum dried at 120° C. for 24 hours.

Subsequently, a rolling process was performed to form a 80 μm thick negative electrode.

(2) Manufacture of Battery

A coin half-cell was manufactured using the negative electrode punched out into a circle of 1.4875 $cm^2$ and a lithium metal thin film cut into a circle of 1.7671 $cm^2$ as the counter electrode. Specifically, an electrode assembly was manufactured using the lithium metal and the negative electrode, with a 50 μm thick polymer separation membrane (PEO+LiFSI, 20:1 (mole ratio)) interposed between.

2. Example 2

Except that for the linear structure, carbon nanotube (CNT 15 μm long) was applied instead of VGCF, an electrode assembly was manufactured by the same method as the manufacturing method of example 1.

3. Example 3

Except that for the linear structure, carbon nano fiber (CNF 50 μm long) was applied instead of VGCF, an electrode assembly was manufactured by the same method as the manufacturing method of example 1.

4. Example 4

Except that for the linear structure, halloysite nanotube (HNT, Sigma-Aldrich, 3 μm long) was applied instead of VGCF, an electrode assembly was manufactured by the same method as the manufacturing method of example 1.

5. Comparative Example 1

Except that the linear structure was not used, and artificial graphite having an average particle size ($D_{50}$) of 20 μm, carbon black as a conductive material, and a polymer solid electrolyte (PEO+LiFSI, 20:1 (mole ratio)) were mixed at a weight ratio of 70:10:20, an electrode assembly was manufactured by the same method as the manufacturing method of example 1.

6. Experimental Example: Evaluation of Life Characteristics

The batteries manufactured in examples 1 to 4 and comparative example 1 were charged and discharged, and their discharge capacity retention ratio was evaluated and the results are shown in Table 1. Meanwhile, in evaluating the life characteristics, charging/discharging was performed with 0.05 C at the temperature of 60° C. and 10 cycles ended in discharged state (lithium is absent in the negative electrode), and the capacity retention ratio was evaluated.

Charging condition: CC (constant current)/CV (constant voltage) (5 mV/0.005 C current cut-off)

Discharging condition: CC (constant current) condition 1.5 V

To find the capacity retention ratio, a ratio of the discharge capacity after 10 cycles to the first discharge capacity was calculated. The results are shown in Table 1.

TABLE 1

|  | Example 1 | Example 2 | Example 3 | Example 4 | Comparative example 1 |
|---|---|---|---|---|---|
| Life characteristics (%, @10 cycles) | 89 | 85 | 92 | 79 | 62 |

From the above Table 1, it can be seen that in the case of examples using the linear structure, the life characteristics were significantly improved compared to comparative example. In the case of the linear structure, in the case of example 3 using CNF that is easy to maintain the linear structure in the electrode and is relatively long, gas discharge channels were formed well and the life characteristics were the best. Additionally, in the case of examples 1 to 3 using the linear structure with conductivity, when comparing to example 4 using HNT with no conductivity, not only gas discharge performance but also electrical conductivity was improved through attainment of additional conductivity, leading to further improved battery performance.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DETAILED DESCRIPTION OF MAIN ELEMENTS

10: Electrode current collector
20: Electrode active material layer
21: Electrode active material particle
22: Solid electrolyte
23: Conductive material
24: Linear structure

What is claimed is:

1. An electrode for an all solid-state battery, comprising:
an electrode current collector; and
an electrode active material layer formed on at least one surface of the electrode current collector,
wherein the electrode active material layer comprises
electrode active material particles,
a solid electrolyte coated on at least part of a surface of the electrode active material particles to connect the electrode active material particles to each other,
wherein the solid electrolyte consists of a polymer-based solid electrolyte formed by adding polymer resin to a solvated lithium salt, comprising polyethyleneoxide and lithium salt,
a linear structure distributed between the electrode active material particles,
wherein the linear structure comprises halloysite nanotube,
wherein microporous channels are formed between the electrode active material particles and the linear structure,
wherein the microporous channels are in communication with the outside of the electrode to provide a gas flow path, through which gas within the electrode can be discharged out of the electrode,
wherein the linear structure is 3 μm to 100 μm in length;
wherein the linear structure has an aspect ratio of 3 or more, and
wherein the linear structure exhibits a tensile strength in a range of 10 MPa to 100 MPa.

2. The electrode for an all solid-state battery according to claim 1, wherein the electrode active material layer further comprises a conductive material that is distributed on the surface of the electrode active material particles, and inside of the solid electrolyte or on a surface of the solid electrolyte.

3. The electrode for an all solid-state battery according to claim 1, wherein the linear structure is 5 μm to 50 μm long.

4. The electrode for an all solid-state battery according to claim 1, wherein the linear structure has a diameter of 30 nm to 10 μm.

5. The electrode for an all solid-state battery according to claim 1, wherein the linear structure consists of halloysite nanotube.

6. The electrode for an all solid-state battery according to claim 1, wherein the polymer-based solid electrolyte is not a gel electrolyte.

7. The electrode for an all solid-state battery according to claim 1, wherein the linear structure does not deform in an electrode rolling process and maintains the aspect ratio.

8. An all solid-state battery, comprising: a positive electrode; a negative electrode; and a solid electrolyte layer interposed between the positive electrode and the negative electrode, wherein at least one of the positive electrode and the negative electrode is the electrode according to claim 1.

9. An all-solid state battery comprising the electrode according to claim 1.

\* \* \* \* \*